Patented Dec. 29, 1931

1,838,618

UNITED STATES PATENT OFFICE

MANFRED ETHELWOLD GRIFFITHS, OF STOWMARKET, ENGLAND, ASSIGNOR, BY MESNE ASSIGNMENTS, TO THE A. S. BOYLE COMPANY, OF CINCINNATI, OHIO, A CORPORATION OF OHIO

PLASTIC COMPOSITION

No Drawing. Application filed November 17, 1923. Serial No. 675,370.

This invention relates to plastic compositions and has for its object to provide a plastic mass which may be used for many purposes, for example, for filling, coating or moulding, having properties not found in the usual filling and like compositions.

The invention in brief consists in a plastic composition comprising a solution of nitrocellulose, a resinous body and a non-drying oil in a ketonic liquor to which solution a filler is added.

In carrying the invention into effect in one form by way of example:—

17 parts by weight of celluloid scrap
4.5 parts by weight of castor oil
8.5 parts by weight of ester gum are dissolved in a mixture comprising:—

10 parts by weight of industrial spirit;
30 parts by weight of benzol;
30 parts by weight of acetone.

To the viscous solution obtained there is added finely ground wood flour as a filling material in the proportion of 23 parts by weight of filler to 77 parts by weight of solution.

The mixture is treated in a kneeding machine until it is of uniform consistency. It may then be employed for a number of purposes; for example, it may be used by pattern makers for filleting and similar work, by joiners and cabinet makers for filling screw and nail holes, shakes in timber, openings at joints and for preparing or repairing mouldings and carvings or by shoemakers for building up or repairing lasts.

A plastic composition prepared as described above hardens quickly when exposed to the air, adheres firmly to any clean dry foundation, does not blister or powder when exposed to moderate heat and is not affected by water, gasoline or other commonly available liquids.

The composition given above may be modified; for example the proportions may be changed. As a general rule the limits I recommend for the formula given above are approximately as follows:—

| | Parts by weight |
|---|---|
| Celluloid scrap | 15 to 20 |
| Ester gum | 5 to 9 |
| Castor oil | 1 to 5 |
| Methylated spirit | 5 to 15 |
| Benzol | 20 to 30 |
| Acetone | 54 to 21 |

The proportion of weight of filler to weight of solution I prefer to lie between 15 and 30 parts of filler to 85 and 70 parts of solution. On the other hand proportions outside these limits may be employed, for example such as are indicated in some of the specific compositions given below.

To obtain the effects referred to above such wide limits should not be used, but the proportions should lie in the range of 20 to 25 parts of filler to 80 to 75 parts of solution.

As an example of an alternative composition the following is given:—

| | Parts by weight |
|---|---|
| Celluloid scrap | 19 |
| Castor oil | 3 |
| Ester gum | 8 |
| Methyl acetone | 44 |
| Wood flour | 26 |

In place of celluloid scrap other forms of nitrocellulose may be used, such as celluloid in the form of sheet or the like.

In place of castor oil other non-drying vegetable oils may be employed.

Ester gum may be replaced by other resins and in place of acetone other ketones may be used and if it is desired that the composition shall set or dry quickly such should be of low boiling point, for example methyl acetone.

The industrial spirit and benzol may be omitted or replaced by other solvents or diluents.

Other solvents may be used in place of ketones but the latter are preferable. As fillers any suitable filling materials may be used but ground wood flour is preferable though in addition there may be added other ground cellulose material, a mineral filler, such as china clay, talc, powdered silica or the like.

As an example of a mixture in which wood flour and china clay are employed the following is given:—

|  | Parts by weight |
|---|---|
| Celluloid scrap | 10 |
| Castor oil | 4 |
| Ester gum | 7 |
| Methyl acetone | 15 |
| Benzol | 15 |
| Methylated spirit | 5 |
| Wood flour | 24 |
| China clay | 20 |

This mixture is particularly useful for pressing or moulding.

Dyes or pigments may be used to produce any desired colour in the finished product.

As an example of a mixture in which pigment is used the following is given:—

|  | Parts by weight |
|---|---|
| Celluloid scrap | 25 |
| Castor oil | 5 |
| Ester gum | 5 |
| Methyl acetone | 16 |
| Benzol | 4 |
| Methylated spirit | 3 |
| Wood flour | 36 |
| Pigment | 6 |

This mixture also is particularly useful for pressing or moulding.

Having now described my invention what I claim as new and desire to secure by Letters Patent is:—

1. A composition of matter comprising the following bodies in substantially the proportions specified, viz. about 85 to 70 parts by weight of a solution consisting of

|  | Per cent |
|---|---|
| Nitrocellulose | 15 to 20 |
| Resinous matter | 5 to 9 |
| Non-drying vegetable oil | 1 to 5 |
| A nitrocellulose solvent liquor | 79 to 66 | and about 15 to 30 parts by weight of a filling material.

2. A composition of matter comprising the following bodies in substantially the proportions specified, viz. about 85 to 70 parts by weight of a solution consisting of

|  | Per cent |
|---|---|
| Nitrocellulose | 15 to 20 |
| Resinous matter | 5 to 9 |
| Non-drying vegetable oil | 1 to 5 |
| A nitrocellulose solvent liquor | 79 to 66 | and about 15 to 30 parts by weight of finely ground wood flour.

3. A composition of matter comprising the following bodies in substantially the proportions specified, viz. about 85 to 70 parts by weight of a solution consisting of

|  | Per cent |
|---|---|
| Nitrocellulose | 15 to 20 |
| Resinous matter | 5 to 9 |
| Non-drying vegetable oil | 1 to 5 |
| A non-drying cellulose solvent | 54 to 21 |
| A liquid diluent | 25 to 45 | and about 15 to 30 parts by weight of a filling material.

4. A composition of matter comprising the following bodies in substantially the proportions specified, viz. about 85 to 70 parts by weight of a solution consisting of

|  | Per cent |
|---|---|
| Celluloid scrap | 15 to 20 |
| Ester gum | 5 to 9 |
| Castor oil | 1 to 5 |
| Methylated spirit | 5 to 15 |
| Benzol | 20 to 30 |
| A low boiling point ketone | 54 to 21 | and about 15 to 30 parts by weight of a filling material.

5. A doughy putty-like plastic composition comprising nitrocellulose in a solution containing a volatile liquid, and a finely divided cellulose filler in such proportions as to harden upon mere exposure to air to substantially the rigidity and solidity of wood.

6. A doughy putty-like plastic composition comprising nitrocellulose in a solution containing a volatile liquid and a finely divided cellulose filler in such proportions as to harden upon mere exposure to air to substantially the rigidity and solidity of wood, said filler being present in not less than fifteen parts by weight.

7. A doughy putty-like plastic composition comprising nitrocellulose in a solution containing a volatile liquid, and a filler of finely divided wood flour in such proportions as to harden upon mere exposure to air to substantially the rigidity and solidity of wood, said filler being present in not less than fifteen parts by weight.

8. A doughy putty-like plastic composition, comprising nitrocellulose in a solution containing a volatile liquid, a non-drying oil and a finely divided wood filler in such proportions as to harden upon mere exposure to air to substantially the rigidity and solidity of wood.

9. A doughy putty-like plastic composition comprising nitrocellulose in a solution containing a volatile liquid, a non-drying oil and a finely divided cellulose filler in such proportions as to harden upon mere exposure to air to substantially the rigidity and solidity of wood, said filler being present in not less than fifteen parts by weight.

10. A doughy putty-like plastic composition comprising nitrocellulose in a solution containing a volatile liquid, a non-drying oil, and a filler of finely divided wood flour in such proportions as to harden upon mere exposure to air to substantially the rigidity and solidity of wood, said filler being present in not less than fifteen parts by weight.

11. A doughy putty-like plastic composition comprising nitrocellulose in a solution volatile in part at least and containing a ketonic liquor, a non-drying oil, and a finely divided cellulose filler in such proportions as to harden upon mere exposure to air to substantially the rigidity and solidity of wood, said filler being present in not less than fifteen parts by weight.

12. A doughy putty-like plastic composition comprising nitrocellulose in a solution volatile in part at least and containing a ketonic liquor, a non-drying oil, a resinous body, and a finely divided cellulose filler in such proportions as to harden upon mere exposure to air to substantially the rigidity and solidity of wood, said filler being present in not less than fifteen parts by weight.

13. A doughy putty-like plastic composition comprising nitrocellulose in a solution volatile in part at least and containing acetone, castor oil, a resinous body, and a finely divided cellulose filler in such proportions as to harden upon mere exposure to air to substantially the rigidity and solidity of wood.

14. A doughy putty-like plastic composition comprising nitrocellulose in a solution containing a volatile liquid and a finely divided wood filler in such proportions as to harden upon mere exposure to air to substantially the rigidity and solidity of wood.

15. A doughy, putty-like plastic composition comprising nitro-cellulose in a solution containing a volatile liquid, a non-drying oil, and a resinous body, and a finely divided wood filler in such proportions as to harden upon mere exposure to air to substantially the rigidity and solidity of wood, said wood filler being present in not less than fifteen parts by weight.

16. A doughy, putty-like plastic composition comprising nitro-cellulose in a solution containing a volatile liquid, a non-drying oil, and a resinous body, and a finely divided wood filler in such proportions as to harden upon mere exposure to air to substantially the rigidity and solidity of wood.

17. A composition of matter for hole filling and filleting, which before exposure to the air is dough-like and putty-like, and contains finely divided wood, nitrocellulose and a volatile liquid, and after exposure to the air has a wood-like rigidity and solidity and is essentially finely divided wood held together by the nitrocellulose.

18. A composition of matter for hole filling and filleting, which before exposure to the air is dough-like and putty-like and contains a volatile liquid, nitrocellulose, and about 15 to about 30 percent by weight of finely divided wood, and which after exposure to the air has a wood-like solidity and rigidity and is essentially the finely divided wood held together by the nitrocellulose.

In testimony whereof I have signed my name to this specification.

MANFRED ETHELWOLD GRIFFITHS.